R. L. WILCOX.
METHOD FOR PRODUCING SCREWS, BOLTS, PINS, OR THE LIKE.
APPLICATION FILED APR. 15, 1918.
1,325,067.  Patented Dec. 16, 1919.
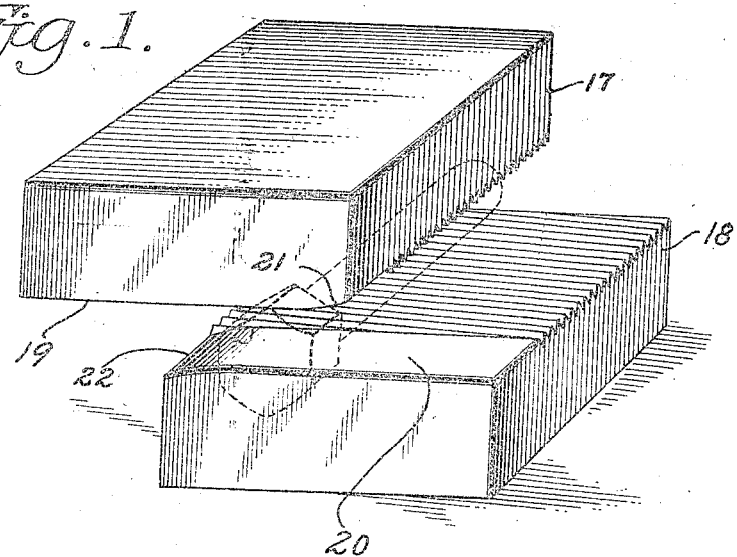
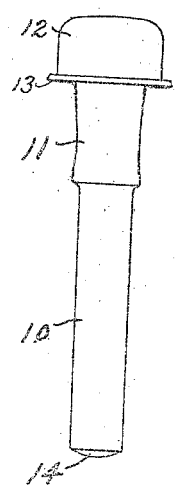
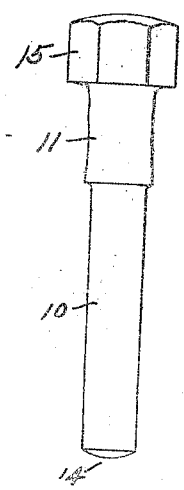
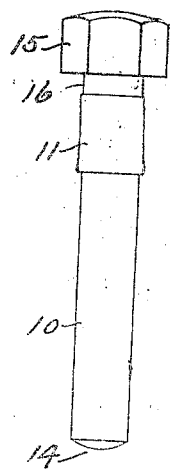
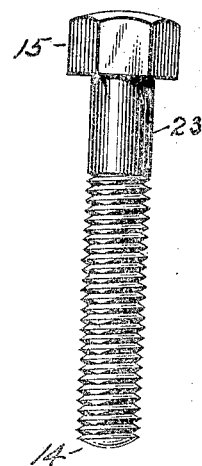
Inventor
Richard Lester Wilcox
By his Attorney
George E. Kirk

# UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

METHOD FOR PRODUCING SCREWS, BOLTS, PINS, OR THE LIKE.

1,325,637.

Specification of Letters Patent.

Patented Dec. 16, 1919.

Application filed April 15, 1918. Serial No. 228,562.

*To all whom it may concern:*

Be it known that I, RICHARD LESTER WILCOX, a citizen of the United States and a resident of Waterbury, county of New Haven, State of Connecticut, have invented certain new and useful Improvements in Methods for Producing Screws, Bolts, Pins, or the like, of which the following is a specification.

My invention relates to methods by which screws, bolts, pins or the like may be produced and more especially to methods by which such articles may be produced with a minimum waste of material and in a minimum time.

One of the objects of my invention, among others, is to produce finished headed threaded articles from wire of substantially the diameter of the body of the finished article so that the usual waste of material in cutting the threads from a solid bar will be avoided.

With this and other objects in view, which will be more specifically pointed out hereinafter, I have invented the method described herein and illustrated in the accompanying drawings in which—

Figure 1 represents an arrangement suitable for carrying out one step of my preferred method as applied to a bolt or screw and Figs. 2, 3, 4 and 5 represent successive steps or operations in my preferred method, beginning with the rough blank and ending with the finished bolt or screw.

In order to illustrate the preferred form of my invention I have adopted the making of a hexagon headed screw or bolt, but it will be understood that my invention is by no means confined to the formation of this, or in fact any specific form of screw, bolt or pin.

In Fig. 2, I have illustrated a rough blank as the same would be produced in a wire heading machine of any well known type, in which the metal is cut to the proper length and then headed in appropriate dies. Such a blank could also be produced in any other appropriate manner as by forging, but I prefer to produce it in the manner just described. The shank or body portion 10 of this blank is cylindrical. If made by upsetting a head on wire, this shank would be the diameter of the wire from which the blank was made. 11 is an enlargement of the shank or body member which would be generally cylindrical but rough in its outlines as it comes from the die. 12 is an enlargement from which the head of the screw is ultimately to be cut. This enlargement may be cylindrical or any other appropriate shape in cross-section, according to the shape of the head of the finished screw to be made. 13 is a fin of surplus metal that may be formed between the dies when the enlargement 12 is upset. I have illustrated the end of the screw at 14 as being rounded, this operation usually being performed after the blank is formed.

In Fig. 3 is shown the second stage of the blank when my preferred method is used to produce a polygonal headed screw or pin. The blank of Fig. 2 has been passed through appropriate cutting or trimming devices by which the polygonal shape 15 is given to the sides of the head. This shaping preferably is done by suitable dies.

In Fig. 4, is shown the third stage of the blank when my preferred method is used to produce a polygonal headed screw or pin. Here the blank has been turned so as to finish the top and bottom of the head and, when the last named operation was performed, the cutting tool was carried into the enlarged part 11 of the shank to turn the same to approximately the diameter of the plain part 23 of the finished screw, the width of this cut as at 16, preferably being relatively narrow. Fig. 5 represents the finished screw which results from the last step of the preferred form of my invention when applied to the production of polygonal headed screw. The preferred method of carrying out this last step I have illustrated in Fig. 1, in which a part of the threading dies 17, 18 of the usual construction have formed on them adjacent the threads, plain platens 19, 20, each having a gradual slope 21, 22 approaching the normal level of the platen. As is well understood in the art the thread rolling dies 17, 18 are made to reciprocate and the body portion of a blank will be fed between them so that the thread on the body portion will be rolled completely at one reciprocation. By adding the platen portions, 19, 20 which engage the enlarged body portion 11 of the blank, I simultaneously roll this body portion into a cylindrical shape of the diameter of the plain part 23 of the shank of the finished screw, thus completing the screw and also insuring that the plain and the threaded portions of the screws are concentric.

The slopes 21, 22, permit the body portion 11 to enter the space between the platens 19, 20 gradually. It will be understood, of course, that the space between the platens 19, 20 is equal to the diameter of the plain part 23 of the finished shank.

While I have shown the platens as part of the threading dies, they may be separate pieces, if desired.

I have found in practice that it is preferable to provide the turned portion 16 so that the surplus metal on the enlargement 11 can flow into the same. But the turned portion 16 is by no means necessary, it being possible to roll the portion 11 without it.

While the method which I have described is the one which I prefer, it will be obvious that it may be varied within wide limits, particularly in accordance with the various kinds of screws to be produced.

While, as a matter of economy of time and also to insure the concentricity of the threaded and the plain portions of the screw, I prefer to roll the plain portion and the thread at the same time, it should be understood that for some purposes these operations may be carried out successively. While for purposes of illustration I have shown the rolling of the plain portion and of the threads as being carried out by the method known as "platen rolling" it will be obvious to those skilled in the art, that the same may be done by any other method of rolling as with rollers only or with a platen and a roller.

While I have described my method in connection with the production of a polygonal headed screw it will be understood that my method may be used for the production of screws with any other kind of head and, indeed, may be used for screws of the headless type. Obviously, the kind of finish to be given the head will depend on the shape of the head and, if the screws are of the headless type, then the head finishing operations which I have described will, of course, be omitted.

It will also be understood that while I have described the preferred sequence of operations in carrying out the preferred form of my method, such sequence is by no means essential. For instance, it is possible to roll and thread the screw before finishing the head. I do not wish, therefore, to be limited to the particular sequence in which the steps are enumerated in the appended claims.

While my novel method is intended primarily for the production of screws it will be understood that it is not limited to such product. For instance, if it is desired to produce a headed fastener of any type, my method may be used by omitting the threaded operation. Such forms of fastenings are found, for instance, in headed pins used in some forms of chain construction and the like.

While, because of the extreme cheapness of the operation I prefer to roll the threads on the screws, it will be understood that my method is not limited to such rolling, since this threading may be done in many different ways. If the thread is to be cut by the usual dies, then, of course, the enlarged body portion 11 would normally not be provided, such enlargement being provided in the form of blank which I have illustrated, because the thread rolling operation enlarges the diameter of the body portion of the blank, and the enlargement 11 is necessary to bring the plain portion of the screw to the diameter of the tops of the threads.

I claim:

1. The method of producing finished polygonal headed screws from blanks, comprising the forming of a head and an enlargement of the body adjacent the head on a length of the blanks, by dies, the cutting of the polygonal sides of the head, the finishing of the bottom of the head and the turning of a portion of the body of the blank adjacent the head to substantially the finished size of the plain portion of the body of the finished screw, the diameter of this turned portion being less than that of said enlargement, the simultaneous rolling of the blanks between a pair of platens to size and true the enlarged body portion to the size and shape of the plain portion of the body of the finished screw and between a pair of threading dies to thread the remainder of the body of the blank.

2. The method of producing finished polygonal headed screws from blanks, comprising the forming of a head and an enlargement of the body adjacent the head, on a length of the wire by dies, the forming of the polygonal sides of the head, the finishing of the bottom of the head and forming a portion of the body of the blank adjacent the head to substantially the finished size of the plain portion of the body of the finished screw, the diameter of this turned portion being less than that of said enlargement, the simultaneous rolling of the blanks to size and true the enlarged body portion to the size and shape of the plain portion of the body of the finished screw and between a pair of threading dies to thread the remainder of the body of the blank.

3. The method of producing finished polygonal headed screws from headed blanks having a generally cylindrical body, comprising the cutting of the polygonal sides of the head, the finishing of bottom of the head, the rolling of a portion of the body of the blank to the size and shape of the plain part of the finished screw and the threading of the remaining portion of the body.

4. The method of producing finished headed screws from blanks, comprising the forming of a head and an enlargement of the body adjacent the head on a length of the blanks, by dies, the finishing of the head, including the turning of a small portion of the body of the blank to the finished size of the plain portion of the body of the finished screw, the rolling of the blank between a pair of platens to size and true the enlarged body portion to the size and shape of the plain portion of the body of the finished screw and between a pair of threading dies to thread the remaining portion of the body.

5. The method of producing finished headed screws from blanks, comprising the forming of a head and an enlargement of the body adjacent the head on a length of the blanks, by dies, the finishing of the head, including the turning of a small portion of the body of the blank to the finished size of the plain portion of the body of the finished screw, the diameter of this turned portion being less than that of said enlargement, the rolling of the blank between a pair of platens to size and true the enlarged body portion to the size and shape of the plain portion of the body of the finished screw and between a pair of threading dies to thread the remaining portion of the body, the two rolling operations occurring simultaneously.

6. The method of producing finished headed screws from blanks having a generally cylindrical body and a head thereon, comprising the forming of said body with an enlarged portion adjacent to the head, finishing the head, the rolling of the blank between a pair of platens to reduce the size and true the said enlarged portion to the size and shape of the plain portion of the body of the finished screw and the rolling of the remaining portion of the body between a pair of threading dies to thread it.

7. The method of producing finished headed screws from blanks having a generally cylindrical body and a head thereon, comprising the forming of said body with an enlarged portion adjacent to the head, finishing the head, the rolling of the blank between a pair of platens to reduce the size and true the said enlarged portion to the size and shape of the plain portion of the body of the finished screw and the rolling of the remaining portion of the body between a pair of threading dies to thread it, the two rolling operations occurring simultaneously.

8. The method of producing finished headed screws from blanks having a generally cylindrical body, comprising the finishing of the head, the turning of a small portion of the body to the finished size of the plain part of the finished screw, the rolling of a portion of the body to the size and shape of the plain part of the finished screw and the threading of the remaining portion of the body.

9. The method of producing finished screws from blanks having a generally cylindrical body, which comprises the forming of an enlarged portion upon said body adjacent to the head, the simultaneous rolling of a part of the body between a pair of plain platens to reduce the size and true said enlarged portion to the size and shape of the unthreaded portion of the body of the finished screw and the remaining portion of the body between a pair of threading dies to thread the said remaining portion.

10. The method of producing finished screws from blanks having a generally cylindrical body, which comprises the forming of an enlarged portion upon said body adjacent to the head, the rolling of said enlarged portion to reduce the size and true that part of the body to the size and shape of the unthreaded portion of the body of the finished screw and the rolling of the remaining portion of the body between a pair of threading dies to thread the said remaining portion.

11. The method of producing finished screws from blanks having a generally cylindrical body, which comprises the forming of an enlarged portion upon said body adjacent to the head, the rolling to reduce the size and true said enlarged portion to the size and shape of the unthreaded portion of the body of the finished screw and threading the remaining portion of the blank.

12. The method of producing finished headed members such as screws, pins or the like, from rough blanks having a generally cylindrical body and an enlarged portion adjacent to the head, comprising the finishing of the head and the rolling of said enlarged portion to size and true it to the size and shape of the unthreaded or plain body portion of the finished member.

13. The method of producing headed screws or bolts from material of substantially uniform diameter comprising the forming of a head upon one end thereof and an enlargement of said material adjacent to the head, said enlargement being of substantially the same or slightly greater diameter than that of the threaded portion after the threads have been rolled thereon and the rolling of the blank between threading dies to thread the remainder of the body of the blank and platens to size and shape said enlarged portion to substantially the size and shape of the threaded portion.

14. The method of producing headed screws or bolts consisting in forming a blank with a head on one end, and a shank having one portion of less diameter than the other portion, the diameter of the enlarged portion being substantially the same or slightly larger than the outside diameter of the threads when rolled on the smaller portion; and the rolling of said smaller portion between threading dies to roll a thread thereon, and the larger portion between platens to size and shape the same to substantially the size and shape of the threaded portion.

RICHARD LESTER WILCOX.